(12) United States Patent
Nachenberg

(10) Patent No.: US 7,406,714 B1
(45) Date of Patent: Jul. 29, 2008

(54) COMPUTER CODE INTRUSION DETECTION SYSTEM BASED ON ACCEPTABLE RETRIEVALS

(75) Inventor: Carey Nachenberg, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 822 days.

(21) Appl. No.: 10/632,857

(22) Filed: Jul. 31, 2003

Related U.S. Application Data

(63) Continuation-in-part of application No. 10/612,198, filed on Jul. 1, 2003.

(51) Int. Cl.
*G08B 23/00* (2006.01)
*G06F 11/00* (2006.01)

(52) U.S. Cl. .................................. 726/23; 726/22
(58) Field of Classification Search ............. 726/22–25
See application file for complete search history.

(56) References Cited

U.S. PATENT DOCUMENTS

| | | | |
|---|---|---|---|
| 4,959,849 A | 9/1990 | Bhusri | |
| 5,355,474 A | 10/1994 | Thuraisngham et al. | |
| 5,584,024 A | 12/1996 | Shwartz | |
| 5,664,172 A | 9/1997 | Antoshenkov | |
| 5,694,595 A | 12/1997 | Jacobs et al. | |
| 5,742,806 A | 4/1998 | Reiner et al. | |
| 5,826,076 A | 10/1998 | Bradley et al. | |
| 5,961,582 A | 10/1999 | Gaines | |
| 6,088,803 A | 7/2000 | Tso et al. | |
| 6,128,740 A | 10/2000 | Curry et al. | |
| 6,282,546 B1 | 8/2001 | Gleichauf et al. | |
| 6,311,278 B1 | 10/2001 | Raanan et al. | |
| 6,314,409 B2 | 11/2001 | Schneck et al. | |
| 6,321,337 B1 | 11/2001 | Reshef et al. | |
| 6,356,887 B1 | 3/2002 | Berenson et al. | |
| 6,584,569 B2 | 6/2003 | Reshef et al. | |
| 6,598,038 B1 | 7/2003 | Guay et al. | |
| 6,775,657 B1 | 8/2004 | Baker | |
| 6,775,827 B1 | 8/2004 | Harkins | |
| 6,839,850 B1 | 1/2005 | Campbell et al. | |
| 6,851,113 B2 | 2/2005 | Hemsath | |

(Continued)

FOREIGN PATENT DOCUMENTS

WO    WO 01/71499 A1    9/2001

OTHER PUBLICATIONS

Oracle, Understanding Query Expressions ("Oracle 8 ConText Cartridge Ap[plication Developer's Guide. Release 2.3"), 1997, http://download-east.oracle.com/docs/cd/A58617_01/cartridg.804/a58164/ch03.htm.*

(Continued)

*Primary Examiner*—Kambiz Zand
*Assistant Examiner*—Peter Poltorak
(74) *Attorney, Agent, or Firm*—Fenwick & West LLP

(57) ABSTRACT

Methods, apparati, and computer-readable media for protecting computer code (1) from malicious retrievers (3). A method embodiment of the present invention comprises the steps of generating (22) retrieval information characteristic of data sent to a retriever (3) by the computer code (1) in response to a retrieval command (5) issued by the retriever (3); accessing at least one rule (6) using at least some of said retrieval information as an input to said at least one rule (6); and, when said at least one rule (6) informs that the retrieval is not acceptable, flagging (28) the retrieval command (5) as suspicious.

32 Claims, 5 Drawing Sheets

U.S. PATENT DOCUMENTS

| | | | |
|---|---|---|---|
| 6,928,553 | B2 | 8/2005 | Xiong et al. |
| 7,047,369 | B1 | 5/2006 | Gruper et al. |
| 7,085,780 | B2 | 8/2006 | Sakamoto et al. |
| 7,085,928 | B1 | 8/2006 | Schmid et al. |
| 7,120,645 | B2 | 10/2006 | Manikutty et al. |
| 7,120,933 | B2 * | 10/2006 | Mattsson ............ 726/22 |
| 7,185,232 | B1 | 2/2007 | Leavy et al. |
| 7,237,265 | B2 | 6/2007 | Reshef et al. |
| 7,240,201 | B2 | 7/2007 | Neufeld et al. |
| 7,296,274 | B2 | 11/2007 | Cohen et al. |
| 2002/0065896 | A1 | 5/2002 | Burakoff et al. |
| 2002/0083343 | A1 | 6/2002 | Crosbie et al. |
| 2002/0087882 | A1 | 7/2002 | Schneider et al. |
| 2002/0157020 | A1 | 10/2002 | Royer |
| 2003/0037251 | A1 | 2/2003 | Frieder et al. |
| 2003/0051026 | A1 | 3/2003 | Carter et al. |
| 2003/0069880 | A1 | 4/2003 | Harrison et al. |
| 2003/0101355 | A1 | 5/2003 | Mattsson |
| 2003/0133554 | A1 * | 7/2003 | Nykanen et al. ...... 379/201.01 |
| 2003/0145226 | A1 | 7/2003 | Bruton et al. |
| 2003/0154402 | A1 | 8/2003 | Pandit et al. |
| 2003/0167229 | A1 | 9/2003 | Ludwig et al. |
| 2003/0188189 | A1 | 10/2003 | Desai et al. |
| 2003/0204719 | A1 | 10/2003 | Ben-Itzhak |
| 2003/0221123 | A1 | 11/2003 | Beavers |
| 2003/0233583 | A1 | 12/2003 | Carley |
| 2004/0098617 | A1 * | 5/2004 | Sekar ................ 713/201 |
| 2004/0098623 | A1 | 5/2004 | Scheidell |
| 2004/0193656 | A1 | 9/2004 | Pizzo et al. |
| 2004/0199535 | A1 | 10/2004 | Zuk |
| 2004/0199647 | A1 | 10/2004 | Ramarao et al. |
| 2004/0205360 | A1 | 10/2004 | Norton et al. |
| 2004/0220915 | A1 | 11/2004 | Kline et al. |
| 2004/0250127 | A1 * | 12/2004 | Scoredos et al. ........... 713/201 |
| 2004/0250134 | A1 | 12/2004 | Kohler et al. |
| 2004/0260945 | A1 | 12/2004 | Raikar et al. |
| 2005/0086529 | A1 | 4/2005 | Buchsbaum |
| 2005/0097149 | A1 | 5/2005 | Vaitzblit et al. |
| 2005/0138006 | A1 | 6/2005 | Bennett et al. |
| 2005/0138426 | A1 | 6/2005 | Styslinger |
| 2005/0154733 | A1 | 7/2005 | Meltzer et al. |
| 2005/0203886 | A1 | 9/2005 | Wong |
| 2005/0203921 | A1 | 9/2005 | Newman et al. |
| 2005/0273859 | A1 | 12/2005 | Chess et al. |
| 2005/0289187 | A1 | 12/2005 | Wong et al. |
| 2006/0070128 | A1 | 3/2006 | Heimerdinger et al. |
| 2006/0117386 | A1 | 6/2006 | Gupta et al. |
| 2006/0212438 | A1 | 9/2006 | Ng |
| 2006/0212941 | A1 | 9/2006 | Bronnikov et al. |
| 2006/0242136 | A1 | 10/2006 | Hammond et al. |
| 2007/0074188 | A1 | 3/2007 | Huang et al. |
| 2007/0094728 | A1 | 4/2007 | Julisch et al. |
| 2007/0169194 | A1 | 7/2007 | Church et al. |

OTHER PUBLICATIONS

Pfleeger (Charles P. Pfleeger, "Security in computing", 2nd edition 1996, ISBN: 0133374866), 426-433.*

Weisstein, "The CRC concise encyclopedia of mathematics", ISBN: 0849396409, 1998, p. 17-26.*

Low, Wai Lup, et al., "DIDAFIT: Detecting Intrusions In Databases Through Fingerprinting Transactions," ICEIS 2002, Fourth International Conference On Enterprise Information Systems, vol. 1, Apr. 3-6, 2002, pp. 121-128, Ciudad Real, Spain.

AirCert web page, last updated Sep. 18, 2000 [online]. Cert.org [retrieved Apr. 18, 2003]. Retrieved from the Internet<URL:http://www.cert.org/kb/aircert/>.

Analysis Console for Intrusion Detection (ACID) web page [online]. Andrew.cmu.edu [retrieved Apr. 18, 2003]. Retrieved from the Internet<URL:http://www.andrew.cmu.edu/~rdanyliw/snort/snortacid.html>.

"Caltarian Security Technology Platform," Riptech web pages [online]. Symanec.com [retrieved Apr. 18, 2003]. Retrieved from the Internet<URL:http://wnterprisesecurity.symantec.com/Content/displayPDF.cfm?SSSPDFID=35&EID=O>.

Change log for Analysis Console for intrusion Detection (Acid), indicating release date of Sep. 8, 2000 [online]. Andrew.cmu.edu [retrieved Apr. 18, 2003]. Retrieved from the Internet:<URL:http://www.andrew.cmu.edu/~rdanyliw/snort/CHANGELOG>.

CyberGuard Corporation, "CyberGuard and Webwasher: The Value Proposition," A CyberGuard Corporation White Paper, May 2004, 6 pages.

e=Security, Inc., Correlation Technology for Security Event Management, Oct. 7, 2002 [online]. eSecurityins.com [retrieved Apr. 18, 2003]. Retrieved from the Internet:<URL:http://www.esecurityinc.com/downloads/Correlation_WP.pdf>.

Marketing, "Digital Certificates—Best Practices—A Microdasys Whitepaper," bestpractice.doc, Revision 1.1 (Jul. 31, 2003), 6 pages, Czech Republic.

Microdasys, "S C I P Secured Content Inspection: Protecting the Enterprise from CryptoHacks," 2003 by Microdasys Inc., 2 pages, Czech Republic.

MyNetWatchman.com web pages indicating 9/00 beta release [online]. MyNetWatchman.com [retrieved Apr. 18, 2003]. Retrieved from the Internet<URL:http://www.mynetwatchman.com/mynetwatchman>.

Network Computing Solutions—"Microdasys SCIP" [online]. Retrieved on Mar. 18, 2005. Retrieved from the Internet<URL:http://www.ncs/cz/index.php?language=en&menuitem-4&subitem=13>, 2 pages, Czech Republic.

Network Computing Solutions—NSC Homepage—News [online]. Retrieved on Mar. 18, 2005. Retrieved from the Internet<URL:http:/nsc.cz/index/php?language=en&menuitem=0&subitem=4&subitem=13>, 3 pages, Czech Republic.

Parkhouse, Jayne, "Pelican Save TNet 2.0," [online] Jun. 2000, SC Magazine Product Review, [retrieved Dec. 1, 2003] Retrieved from the Internet<URL:http://www.scmagazine.com/standalone/pelican/sc_pelican.html>.

"PostgreSQL Interactive Documentation," May 2001, [online] [Archived by http://archive.org on Jun. 6, 2001; Retrieved on Dec. 19, 2006] Retrieved from the Internet<URL:http://web.archive.org/web/20010606011227/www.postgresql.org/idocs/index.php?overv...>.

2000 Review of eSecurity product on Network Security web page [online]. SCMagazine.com [retrieved Apr. 18, 2003]. Retrieved from the Internet<URL:http://www.scmagazine.com/scmagazine/2000_12/testc/network.htm#Open>.

Schneier, Bruce, Managed Security Monitoring: Network Security for the 21st Century, 2001 [online]. Conterpane.com [retrieved Apr. 18, 2003]. Retrieved from the Internet:<URL:http://www.counterpane.com/msm.pdf>.

SCIP Product, Microdays—"The need to control, inspect and manage encrypted webtraffic." [online]. Retrieved on Mar. 18, 2005. Retrieved from the Internet<URL:http://www.microdasys.com/scipproduct+M54a708de802.html>. Author unknown, 2 pages, Czech Republic.

Slashdot.org web pages describing Dshield, dated Nov. 27, 2000 [online]. Slashdot.org [retrieved Apr. 18, 2003]. Retrieved from the Internet:<URL:http://slashdot.org/article.pl?sid=00/11/27/1957238&mode=thread<.

SSL Stripper Home Page, "Security Solutions: Sample Screenshots," [online]. Retrieved on Mar. 18, 2005. Retrieved from the Ineternet<URL:http://www.vroyer.org/sslstripper/index.html>, 2 pages, Oct. 15, 2004, U.S.A.

"SSL Stripper Installation Guide," [online]. Retrieved in Mar. 2005 from the Internet<URL:http://www.sslstripper.com>, 2 pages, U.S.A.

SSL Stripper Sample Screenshots. "Security Solutions: Sample Screenshots," [online]. Retrieved on Mar. 18, 20056. Retrieved from the Internet<URL:http://www.vroyer.org/sslstripper/screenshots.html>, 3 pages, Oct. 15, 2004, U.S.A.

Symantec™ Incident Manager http://enterprisesecurity.symantec.com, copyright date Jun. 2003.

Web page, announcing Nov. 11, 2000 release of Dshield [online]. Deja.com [retrieved Apr. 18, 2003]. Retrieved from the Internet<URL:http://groups/google.com/groups?selm=8vm48v%245pd%241%40nnrp1.deja.com&oe=UTF-8&output=gplain>.

Webwasher AG/Full feature set, "Full feature set," [online]. Retrieved on Mar. 18, 2005, Retrieved from the Internet<URL:http://www.webwasher.com/enterprise/products/webwasher_products/ssl_scanner/full_feature_set..html?l...>, 2 pages.

Webwasher AG/Webwasher Anti Spam, "Webwasher Anti Spam," [online]. Retrieved on Mar. 18, 2005. Retrieved from the Internet<URL:http://www.webwasher.com/enterprise/products/webwasher_products/anti_spam/index.htm...>, 1 page.

Webwasher AG/Webwasher Anti Virus, "Webwasher Anti Virus," [online]. Retrieved on Mar. 18, 2005. Retrieved from the Internet<URL:http://www.webwasher.com/enterprise/products/webwasher_products/anti_virus/index.html..>, 2 pages.

Webwasher AG/Webwasher Content Protection,"Webwasher Content Protection," [online]. Retrieved on Mar. 18, 2005, Retrieved from the Internet<URL:http://www.webwasher.com/enterprise/products/webwasher_products/content_protection/index.html>, 2 pages.

Webwasher AG/Webwasher 1000 CSM Appliance, "Webwasher 1000 CSM Appliance,"[online]. Retrieved on Mar. 18, 2005. Retrieved from the Internet<URL:http://www.webwasher.com/enterprise/products/webwasher_products/scm_appliance/index...> 2 pages.

Webwasher AG/Webwasher SSL Scanner, "Webwasher SSL Scanner," [online]. Retrieved on Mar. 118, 2005. Retrieved from the Internet:<URL:http://www.webwasher.com/enterprise/products/webwasher_products/ssl_scanner/index.html>, 2 pages.

Webwasher AG/Webwasher URL Filter, "Webwasher URL Filter," [online], Retrieved on Mar. 18, 2005.

Retrieved from the Internet<URL:http://www.webwasher.com/enterprise/products/webwasher_products/webwasher_url_filter..>, 1 page.

Chung, Christina Yip, et al., "Demids: A Misuse Detection System for Database Systems", Department of Computer Science, University of California at Davis; Oct. 1, 1999; pp. 1-18, California, U.S.A.

Lee, Sin Yeung, et al., "Learning Fingerprints for a Database Intrusion Detection System", ESORICS 2002, Springer-Verlag, Berlin Heidelberg Germany, pp. 264-279.

Kruegel, C. et al., "Anomaly Detection of Web-Based Attacks," CCS'03, Oct. 27-31, 2003, ACM, pp. 251-261.

Halfond, W.G.J. et al., "Combining Static Analysis and Runtime Monitoring to Counter SQL-Injection Attacks," Workshop on Dynamic Analysis, (WODA 2005), May 17, 2005, St. Louis, MO, USA.

Archive of "Postgre SQL 7.1 Documentation," www.postgresql.org, [online] [Archived by http://archive.org on Jun. 6, 2001; Retrieved in May 2001] Retrieved from the Internet<URL:http://web.archive.org/web/20010606011227/www.postgresql.org/idocs/idnex.php?overv...>.

Johnson R., Protecting Your Data and Your Microsoft SQL Server, Entercept Security Technologies, p. 1-12 [online], Oct. 2, 2002, [retrieved on Jan. 30, 2004]. Retrieved from the Internet:: <URL: http://networkassociates.com/us/tier2/products/media/mcatee/wp-sq/protection.pdf>.

KR Ügel, C. et al., "A Survey On Intrusion Detection Systems," Distributed Systems Group, Technical University of Vienna, Dec. 12, 2000, pp. 1-36.

Ramasubramanian, P. et al., "Quickprop Neural Network Ensemble Forecasting Framework For A Database Intrusion Prediction System," Neural Information Processing - Letters And Reviews, Oct. 2004, pp. 9-18, vol. 5, No. 1.

Solutions by Tech Target, Entercept Database Edition, Nov. 2002, [retrieved on Jan. 9, 2004]. Retrieved from the Internet: <URL: http//infosecuritymag.techtarget.com/2002/nov/solutions.shtml>.

Valeur, F. et al, "A Learning-Based Approach To The Detection Of SQL Attacks," Proceedings of the Conference on Detection of Intrusions and Malware & Vulnerability Assessment (DIMVA), Vienna, Austria, Jul. 2005, 18 pages.

* cited by examiner

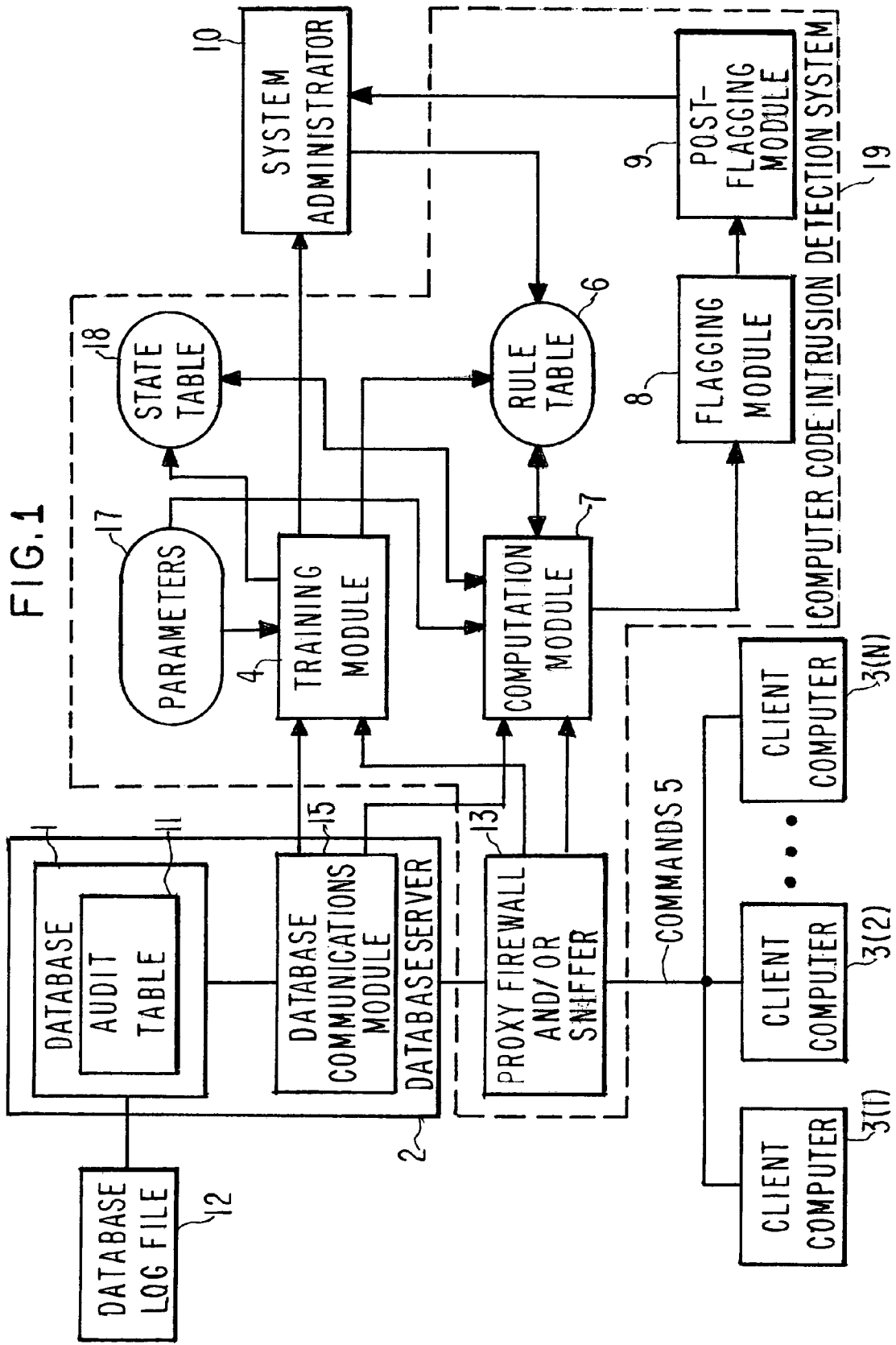

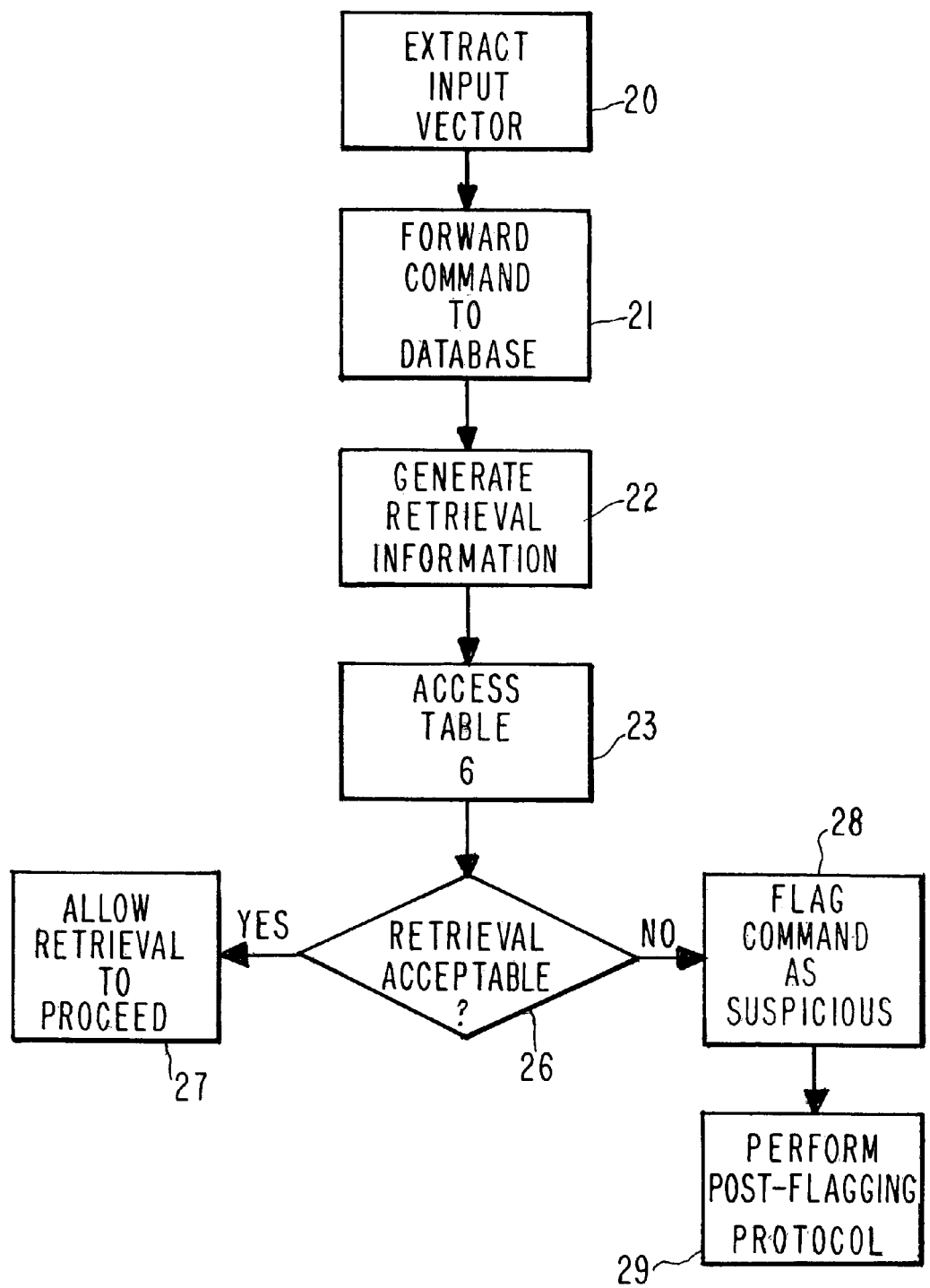

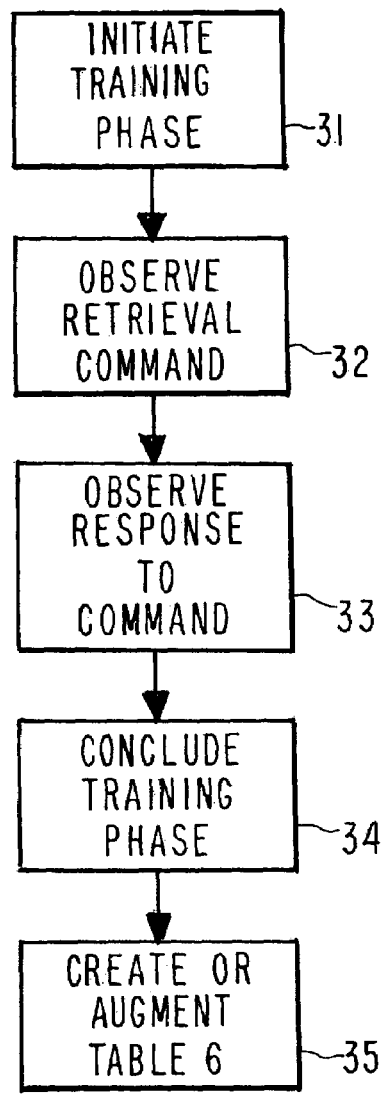
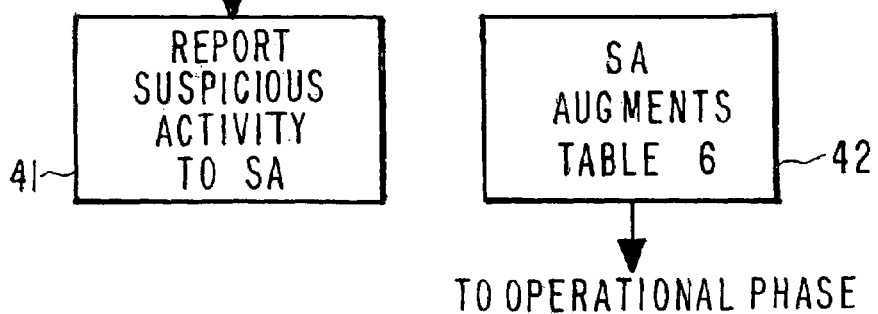

FIG. 5

| ENTRY # | INPUT VECTOR | RETRIEVAL INFORMATION |
|---|---|---|
| 1 | PRESENT COMMAND | 5 ROWS<br>3 COLUMNS      } RETRIEVAL VECTOR<br>COLUMNS   A, J, AND K<br>S = 2000 ROWS/SECOND<br>D = 2300 COLUMNS/SECOND |
| 2 | NONE | RATE OF RETRIEVING ROWS WAS 2000 ROWS/SECOND ACROSS ALL COMMANDS |
| 3 | $L_1 F_1 A_1$ | RETRIEVAL VECTOR 1<br>5 ROWS, 3 COLUMNS - 963 OCCURRENCES<br>RETRIEVAL VECTOR 2<br>7 ROWS, 2 COLUMNS - 51 OCCURRENCES<br>S = 1.1 ROW/SECOND<br>D = 2.3 COLUMNS/SECOND |

| ENTRY # | INPUT VECTOR | RULES |
|---|---|---|
| 1 | NONE | RULE 5: NO MORE THAN 1000 ROWS/SEC. CAN EVER BE RETRIEVED BY ANYBODY |
| 2 | $L_1 F_1 A_1$ | RULE 1: BETWEEN 4 AND 6 ROWS; AND BETWEEN 2 AND 4 COLUMNS ARE ACCEPTABLE<br>RULE 2: BETWEEN 6 AND 8 ROWS; AND BETWEEN 1 AND 3 COLUMNS ARE ACCEPTABLE<br>RULE 3: S BETWEEN 1.0 AND 1.2 IS ACCEPTABE<br>RULE 4: D BETWEEN 2.2 AND 2.4 IS ACCEPTABLE |
| 3 | $L_1$ | RULE 6: NO RETRIEVALS ARE ALLOWED BETWEEN 6 P.M. AND MIDNIGHT UNLESS RULE 7 IS SATISFIED |
| 4 | $F_1$ | RULE 7: D LESS THAN 10/MINUTE |

COMPUTER CODE INTRUSION DETECTION SYSTEM BASED ON ACCEPTABLE RETRIEVALS

RELATED APPLICATION

This patent application is a continuation-in-part of commonly assigned U.S. patent application Ser. No. 10/612,198 filed Jul. 1, 2003, entitled "Real-Time Training for a Computer Code Intrusion Detection System", which patent application is hereby incorporated by reference in its entirety into the present patent application.

TECHNICAL FIELD

This invention pertains to the field of thwarting intrusions perpetrated by malicious attackers to computer code (e.g., databases).

BACKGROUND ART

The background art includes intrusion thwarting systems where the computer code being attacked is a database. Such systems are called database intrusion detection systems. Some of these systems utilize offline non-real-time training in order to detect suspicious or anomalous activity. Examples of offline non-real-time database intrusion detection systems are described in Lee, et al., "Learning Fingerprints for a Database Intrusion Detection System", *ESORICS* 2002, pp. 264-279, published in November 2002 by Springer-Verlag, Berlin and Heidelberg, Germany; and C. Chung, et al., "DEMIDS: A Misuse Detection System for Database Systems", Department of Computer Science, University of California at Davis, Davis, Calif., Oct. 1, 1999.

A common flaw in database intrusion detection systems of the prior art is that such systems fail to protect the database against insider attempts to steal large amounts of data using legitimate business processes. For example, such a system may allow a given service representative to access fields and tables within the database containing customer credit card information. Normally, a representative might access 5 to 10 accounts per hour in order to service customers. That is fine until the customer service representative decides to launch an insider attack on the database, procuring large amounts of consumer credit card information, which he then uses for nefarious purposes. The present invention is designed to protect against that and other attacks.

DISCLOSURE OF INVENTION

Methods, apparati, and computer-readable media for protecting computer code (1) from malicious retrievers (3). A method embodiment of the present invention comprises the steps of generating (22) retrieval information characteristic of data sent to a retriever (3) by the computer code (1) in response to a retrieval command (5) issued by the retriever (3); accessing at least one rule (6) using at least some of said retrieval information as an input to said at least one rule (6); and, when said at least one rule (6) informs that the retrieval is not acceptable, flagging (28) the retrieval command (5) as suspicious.

BRIEF DESCRIPTION OF THE DRAWINGS

These and other more detailed and specific objects and features of the present invention are more fully disclosed in the following specification, reference being had to the accompanying drawings, in which:

FIG. 1 is a block diagram illustrating embodiments of the present invention.

FIG. 2 is a flow diagram illustrating an operational phase of the present invention.

FIG. 3 is a flow diagram illustrating a training phase of the present invention.

FIG. 4 is a flow diagram illustrating a system administrator phase of the present invention.

FIG. 5 is a diagram illustrating typical contents within state table 18 of the present invention.

FIG. 6 is a diagram illustrating typical contents within rule table 6 of the present invention.

DETAILED DESCRIPTION OF THE PREFERRED EMBODIMENTS

This invention has applicability to any code intrusion detection system, i.e., any system in which computer code 1 is susceptible to being attacked by commands 5 which may be malicious, due to malicious intent on the part of the user 3 who issues the command 5. As used herein, "user" can refer to a client computer 3 and/or to a human who has control of computer 3. As illustrated in FIG. 1, there can be a plurality N of users 3, where N is any positive integer. "User" is sometimes referred to herein as "retriever".

Most of the following description illustrates the special case where the computer code 1 is a database 1. Database 1 can be any type of database, such as a relational database or a flat file. When database 1 is a relational database, commands 5 are typically written in a SQL language. As used herein, "SQL" is taken in the broad sense to mean the original language known as SQL (Structured Query Language), any derivative thereof, or any structured query language used for accessing a relational database. In the case where computer code 1 is not a relational database, the commands can be written in another language, such as XML. Database 1 may have associated therewith an internal audit table 11 and/or an external database log file 12 for storing audit and/or ancillary information pertaining to database 1. Database 1 is typically packaged within a dedicated computer known as a database server 2, which may also contain database communications module 15 and other modules not illustrated.

Computer code intrusion detection system (IDS) 19 (and its special case, database intrusion detection system 19) encompasses modules 4, 6-9, 13, 17, and 18. Modules 1, 4, 6-9, 11-13, 15, 17, and 18 can be implemented in software, firmware, hardware, or any combination thereof, and are typically implemented in software. FIG. 1 illustrates the case where modules 4, 6-9, 13, 17, and 18 are stand-alone modules separate from database server 2. However, these modules could just as well be incorporated within database server 2, e.g., they could be incorporated within database communications module 15. Thus, intrusion detection system 19 could be published by a third party as a standalone package on any type of computer-readable medium, or bundled by the manufacturer of the database 1 with module 15. The purpose of intrusion detection system 19 is to protect computer code 1 from users 3 that have nefarious intent. For example, such users may desire to steal (possibly large amounts of) credit card information from database 1.

One method embodiment of the present invention comprises three phases: a training phase, a system administrator phase, and an operational phase. FIG. 2 illustrates the operational phase of the present invention. At optional step 20, computation module 7 extracts an input vector from a retrieval command 5, using any technique of real-time auditing and/or in-line interception described below in conjunction with step 32. The extraction is typically done in real time or quasi-real-time. As used herein, "real time" means "during a short time interval surrounding the event". Thus, observing a command 5 in real time means that the command 5 is observed during a short time interval surrounding the instant that the command 5 enters the database 1.

A retrieval command 5 is any command by which a retrieving user 3 seeks to retrieve information from the database 1. The input vector characterizes the retrieval command 5 and comprises at least one parameter from the group of parameters comprising: canonicalized commands; the dates and times at which the commands 5 access the computer code 1; logins (user IDs, passwords, catch phrases, etc.) of users 3 issuing the commands 5; the identities of users 3 issuing the commands 5; the departments of the enterprise in which the users 3 work, or other groups to which the users 3 belong; the applications (i.e., software programs or types of software programs) that issue the commands 5; the IP addresses of the issuing computers 3; identities of users 3 accessing a given field or fields within the computer code 1; the times of day that a given user 3 accesses a given field or fields within the computer code 1; the fields or combination of fields being accessed by given commands 5; and tables or combinations of tables within the computer code 1 accessed by the commands.

A canonicalized command is a command 5 stripped of its literal field data. Literal field data is defined as a specific value of a parameter. Thus, for example, let us assume that the command 5 is:

SELECT NAME FROM PATIENTS WHERE NAME LIKE 'FRANK' AND AGE >25

In this case, the literal field data is "FRANK" and "25". Thus, a canonicalized form of the command 5 is:

SELECT NAME FROM PATIENTS WHERE NAME LIKE * AND AGE >*

Literal fields can include literal numbers (plain numbers), dates, times, strings, and potentially named ordinal values (symbolic words used to represent numbers, e.g., "January" represents the first month, "Finance" represents department 54, etc.).

In one embodiment, a retrieval command 5 is subjected to step 20 only if the fields mentioned in the command 5 appear on a preselected list of fields deemed to be important, e.g., credit card and password fields. In other embodiments, the operational phase is performed without the need to extract an input vector, and thus step 20 is not performed at all.

At step 21, the retrieval command 5 is forwarded to the database 1 for processing. When the database 1 finishes processing the retrieval command 5, it normally sends back to user 3 the requested data in the form of rows plus columns and/or tables. A single row of data may contain a credit card number, expiration date, and customer name, i.e., three columns worth of data. A second row of data then would contain a second credit card number, a second expiration date, and a second customer name.

At step 22, computation module 7 observes this response by database 1 (using any technique of real-time auditing and/or in-line interception described below in conjunction with step 32); and generates retrieval information therefrom. This retrieval information is optionally stored in state table 18, potentially along with one or more pieces of information from the input vector (e.g., to maintain data such as "users of the SUPPORT group retrieved an average of 10 customer records per hour"). State table 18 can maintain statistics on client 3 access to particular fields, associating the client 3 with the types of data that the client 3 is accessing. Clients 3 can be identified by user-ID ("Carey"), group-membership ("Average statistics for all members of the FINANCE group"), group-ID ("FINANCE group"), as well as potentially source IP address, machine name identification, client application, or other combinations of zero or more elements of the input vector. State table 18 stores a set of statistics associated with one or more of these client 3 identifiers. State table 18 may also group its data based on other attributes in the input vector, including the set of referenced fields, etc. (see point 8 below). For example:

CAREY's statistics:
1. has downloaded 2000 credit card rows total
2. downloads credit card rows at a rate of 10 per hour during business hours
3. downloads credit card rows at a rate of 3 per hour during off hours
4. has downloaded 1500 password rows total
5. downloads password rows at a rate of 10 per hour during business hours
6. downloads password rows at a rate of 3 per hour during off hours
7. downloads password rows at an average rate of 3 per request
8. For commands that attempt to access fields {USER, PASSWORD, SSN}, the average number of retrieved rows is 1.
9. etc. . . .

FINANCE's average user statistics:
1. has downloaded 23000 credit card rows total.
2. average finance user downloads credit card rows at a rate of 7 per hour during business hours
3. downloads credit card rows at a rate of 1 per hour during off hours
4. etc. . . .

statistics for computer at IP Address 1.2.3.4:
etc.
etc.
etc.

The statistics can be maintained for only those fields deemed critical by the database administrator 10, or for all fields accessed. Clearly, many types of statistics can be maintained, including:
1. average number of row retrievals per given time unit (minutes, hours, seconds)
2. standard deviation of row retrievals per given time unit
3. average number of columns retrieved per time unit, etc.

Typical contents of a state table 18 having three entries are illustrated in FIG. 5. In the first entry, an input vector was not calculated (at step 20), because here the operational phase is operating on a command by command basis. Thus, there is no need to track any identifying information for a particular command 5, because it is the present command 5 that is being processed.

"Retrieval information" consists of two components: one or more retrieval vectors, and statistical information. As used herein, "retrieval vector" comprises at least one of the following: the number of rows retrieved; the number of columns retrieved; the number of tables retrieved; an identification of the columns that were retrieved; and an identification of the tables that were retrieved. Thus, in the present example of entry 1, the retrieval vector can be represented as [5 rows; 3 columns; columns A, J, and K]. As used herein, "statistical information" means any statistics that can be generated from the retrieval, either in conjunction with data stored in state table 18, or on its own. Thus, "statistical information" can comprise one or more of the following statistics: the rate of retrieving rows; the rate of retrieving columns; the rate of retrieving tables; the average number of rows retrieved per retrieval command 5 for a given input vector (or subset of an input vector); the average number of columns retrieved per retrieval command 5 for a given input vector; the average number of tables retrieved per retrieval command 5 for a given input vector; the percentage of retrieval commands 5 for which a given column is accessed; the percentage of retrieval commands 5 for which a given table is accessed; the percentage of retrieval commands 5 for which a given combination of columns is accessed; and the percentage of retrieval commands 5 for which a given combination of tables is accessed.

Note that some of these statistics are compilable across many commands 5, and some are compilable within a single command 5. In the present example of entry 1 in FIG. 5, there are two pieces of statistical information that have been generated by computation module 7 as a result of this particular command 5 accessing this particular database 1: S, the number of rows per second that are retrieved; and D, the number of columns per second that are retrieved. In this example, S=2000 rows per second and D=2300 columns per second.

At step 23, computation module 7 uses retrieval information to access at least one rule 6 pertaining to retrievals. The rules 6 can define acceptable and/or unacceptable retrievals, and can be stored in any manner known to one of ordinary skill in the art. In one embodiment, at least one rule 6 comprises a pre-established table containing rules for acceptable and/or unacceptable retrievals as illustrated in FIG. 6. In the illustrated example, rule table 6 has four entries. In the first entry, there is no input vector, since the corresponding rule is independent of any particular input vector. (It may be said that the input vector is wildcarded.) This emphasizes the fact that it is not necessary for table 6 to be accessed (indexed) by an input vector. In this example, the cognizant rule, rule 5, states: "no more than 1000 rows per second can ever be retrieved by anybody".

At step 26, computation module 7 determines whether table 6 indicates that the retrieval is acceptable or unacceptable. The matching of the retrieval information from table 18 to the rule in table 6 can be performed by any technique known to those of ordinary skill in the art. If table 6 indicates that the retrieval is acceptable, the retrieval is allowed to proceed at step 27, i.e., the requested data is sent to the requesting user 3.

If, on the other hand, the retrieval information from table 18 does not satisfy the corresponding rule in table 6, module 8 flags the current command 5 as being suspicious at step 28. Then a post-flagging protocol is performed by module 9 at step 29. In the illustrated example, the retrieval information "S=2000 rows per second" violates the rule "no more than 1000 rows per second can ever be retrieved by anybody". Thus, steps 28 and 29 are executed.

Execution of the post-flagging protocol at step 29 entails execution of at least one of the following steps: an alert is sent to the system administrator 10; an audit log is updated; the command 5 is not allowed to access the computer code 1; the command 5 is allowed to access the computer code 1, but the access is limited in some way (for example, the amount of data sent back to user 3 is limited); the command 5 is augmented, e.g., investigational code is inserted into the command 5 to provoke an audit trail; the user 3 sending the command 5 is investigated. The latter investigation can be performed by computer means (e.g., sending out a digital trace to determine the identity of the user 3) and/or by off-line means (sending a human private investigator to spy on user 3).

The above example illustrates an embodiment in which table 6 is accessed by retrieval information but not by an input vector. In other embodiments, an input vector (or more than one input vector, as long as the input vectors are from the same command 5), in addition to retrieval information, is used to access table 6. For example, consider the second entry illustrated in FIG. 6. The four rules set forth in said entry 2 are associated with a particular input vector $L_1F_1A_1$. These rules, which are more fully described below in conjunction with the training phase, are valid only with respect to specific input vector $L_1F_1A_1$.

The above examples illustrate the case where the operational phase is performed on a command by command basis. In other embodiments, the retrieval information can be compiled on other bases, for example, with respect to all commands 5 that are executed during a given time period that defines the operational phase, or for the duration of a login by a user 3 to the database 1. This is illustrated in entry 2 of FIG. 5, where the retrieval information is presented without regard to input vector. In this example, the retrieval information that has been compiled in table 18 is the statistic "the rate of retrieving rows was 2000 rows/second across all commands 5". In this example, at step 26, rule 5 from table 6 remains violated, this time for the operational phase taken as a whole. Thus, at step 28, the entire operational phase is flagged as being suspicious, and the post-flagging protocol 29 performed at step 29 is tailored accordingly.

At step 26, all of the retrieval information in state table 18 can be matched against all of the rules in table 6, or just a subset of the retrieval information and/or a subset of the rules can be used for matching.

An example of an embodiment where table 6 is accessed by two input vectors within the same command 5, as well as by retrieval information from table 18, is illustrated in entries 3 and 4 of FIG. 6. Entry 3 gives the rule (rule 6) that for input vector $L_1$, "no retrievals are allowed between 6 p.m. and midnight unless rule 7 is satisfied". Let us assume that L is the log-in of the user 3 issuing the command 5; $L_1$ is "Abacus 34"; and retrieval information stored in table 18 for this command 5 specifies that the command 5 was issued at 8 p.m. Then at step 26, computation module 7 determines that rule 6 is violated, unless rule 7 is satisfied. Thus, table 6 must also be accessed by the second input vector, $F_1$. Let us assume that F is the field being queried by the command 5 and $F_1$ is the credit card number. Then, computation module 7 looks to table 18 to determine whether the credit card number field is retrieved at a rate D less than 10 per minute by that particular command 5.

The contents of table 6 are generated during an optional training phase, and/or are force fed into table 6 by system administrator 10, and/or are provided by a security or other vendor. A typical training phase is illustrated in FIG. 3, and is initiated at step 31. This is done by system administrator 10 flipping a switch (which may be located, for example, on database server 2 or on training module 4); by means of a preselected event occurring (e.g., the first of each month or the addition of a new table within database 1); or by any other means known to one of ordinary skill in the art for starting a computer system.

At step 32, training module 4 observes retrieval commands 5 that users 3 send to database 1. This observation may be done in real time. There are two major ways in which the observing step 32 can be performed: real-time auditing and in-line interception. Real-time auditing is typically used in cases where database 1 has an auditing feature. The auditing information may be placed into an audit table 11 internal to database 1 or into an external database log file 12. In real-time auditing, training module 4 instructs the database 1 to generate a stream of events every time a command 5 enters database 1. The stream can include such items as the text of the command 5, a date/time stamp, information pertaining to the user 3 that issued the command 5, the IP (Internet Protocol) address of the issuing computer 3, the application that issued the command 5, etc.

The stream can appear in string or binary form, and can be extracted using a number of different techniques, depending upon the implementation of the IDS 19, including APIs (Application Programming Interfaces) that access the computer code 1. One example is to use ODBC (Open DataBase Connectivity), a set of C language API's that allows one to examine or modify data within database 1. If the Java programming language is used, JDBC (Java DataBase Connectivity) can be used instead. Another way of extracting the needed information from database 1 is to use code injection or patching to inject logic into one or more modules 1, 15 within database server 2, to transfer control to training module 4. In another embodiment, called "direct database integration", the database 1 vendor, who has access to the commands 5 in conjunction with the normal operation of the database 5, makes the commands 5 available to intrusion detection system 19. In yet another embodiment, in cases where database 1 supports it, external database log file 12 may be examined without the need to resort to special software. Once a retrieval command 5 has been processed by training module 4, the command 5 can optionally be expunged from any table or log file it is stored in, to make room for subsequent commands 5.

In in-line interception, at least one of a proxy, firewall, or sniffer 13 is interposed between database 1 and users 3 (see FIG. 1). The proxy, firewall, and/or sniffer 13 examines packets of information emanating from users 3 and extracts the relevant information therefrom. Proxy, firewall, and/or sniffer 13 may need to decrypt the communications emanating from users 3 if these communications are encrypted.

After a command 5 has been captured in step 32, at step 33 training module 4 observes (extracts) the response of database 1 to the command 5, and updates (augments) state table 18. Step 33 can be performed in real time, i.e., state table 18 can be updated response-by-response. The responses of the database 1 can be extracted using any of the techniques of real-time auditing and/or in-line interception that are described above in conjunction with step 32. Similarly, previously described steps 20 and 22 can be performed using any of the above-described techniques of real-time auditing and/or in-line interception, with computation module 7 rather than training module 4 doing the extraction and generation, respectively.

The operation of step 33 is illustrated in entry 3 of FIG. 5. The retrieval information comprises, for the illustrated input vector $L_1F_1A_1$, two retrieval vectors plus statistical information comprising the number of occurrences of each of the retrieval vectors, plus S and D.

Let us assume that L is the parameter "log-in of the user 3 that issued the command 5". The log-in can be some preselected combination of user ID, password, and answer to a challenge phrase (e.g., "what is your mother's maiden name?"). In this example, $L_1$ is "Abacus34". F is the field being queried by the command 5. $F_1$ is "credit card number". A is the application that issued the command 5 or the IP address of the requesting computer 5. $A_1$ is "Siebel CRM Deluxe Version 22". Let us further assume that during the entirety of the training phase, the only responses generated by database 1 to commands 5 associated with $L_1F_1A_1$ are a plurality of responses having five rows and three columns (retrieval vector 1), and a plurality of responses having seven rows and two columns (retrieval vector 2). Let us further assume that retrieval vector 1 has occurred 963 times, and retrieval vector 2 has occurred 51 times. Thus, the augmentation of state table 18 performed in step 33 for a given command 5 may simply entail incrementing the number of occurrences from 962 to 963, and recalculating S and D. In the illustrated example, the rate S of rows returned by database 1 for this input vector is 1.1 row per second, and the rate D at which database 1 returns columns for this input vector is 2.3 columns per second.

Note that not all of the possible parameters have to be covered in the input vector that is the subject of the training. In this case, just three parameters (out of the many more possible parameters) are so covered (the set of parameters to use may be specified by an administrator 10).

Steps 32 and 33 are repeated for each command 5 that is processed during the training phase.

The training phase is ended, at step 34, by any one of a number of means. For example, system administrator 10 can flip a switch on database server 2 or training module 4. Alternatively, the training phase may end by a statistical technique, e.g., training module 4 monitors the occurrence or frequency of new commonly occurring retrieval vectors. Alternatively, the training phase may end by the occurrence of a preselected elapsed or absolute time, or by any other means known to one of ordinary skill in the art. As with all of the preselected parameters in this patent application, the preselected parameters mentioned in this paragraph may be stored in parameters storage area 17.

At step 35, module 7 converts the retrieval information stored in state table 18 into rules for acceptable and/or unacceptable retrievals within table 6, using preselected set of parameters 17. The administrator 10 may be asked to review and/or augment these rules. Entry 2 of FIG. 6 corresponds to entry 3 of FIG. 5. There are four rules illustrated for said entry. It can be seen that Rule 1 was derived from the retrieval information in FIG. 5 by first concluding that the 963 occurrences of five rows and three columns was greater than a preselected threshold value (e.g., 50) to warrant inclusion in table 6. Then, a preselected margin (in this case, one) in either direction was applied around the observed numbers of rows and columns to generate the rule. The "AND" following the semicolon in rule 1 is a Boolean AND, i.e., both the criterion "between 4 and 6 rows" and the criterion "between 2 and 4 columns" must be satisfied in order for the retrieval to be deemed acceptable at step 26. There may also be Boolean logic underlying the combination of the rules. For example, in order for module 7 to conclude in step 26 that a retrieval is acceptable, it might have been preselected that either Rule 1 AND Rule 3 AND Rule 4 must be satisfied; OR Rule 2 AND Rule 3 AND Rule 4 must be satisfied in order for the retrieval to be deemed acceptable, where "AND" and "OR" are Boolean operators. If one of these two conditions is not satisfied, module 7 determines that the retrieval is suspicious.

Alternative to a preselected integral margin such as the margin of 1 on either side of the observed numbers of rows and columns illustrated above, any statistical technique may be used to generate the rules of table 6 from the corresponding retrieval information. For example, the margin on the positive side of the number of observations may be a preselected percent of the observed value, or a preselected number of standard deviations. The margin on the lower side of the observed value may be the same or a different percent of the observed value, or the same or a different number of standard deviations. Other statistical techniques will be readily attainable by those of ordinary skill in the art.

FIG. 4 illustrates two optional steps, steps 41 and 42, that constitute the system administrator 10 phase. At step 41, suspicious activity that is observed during the optional training phase is reported to system administrator 10. For example, if the retrieval of a certain combination of rows and columns during the training phase is observed to occur fewer than a preselected threshold number of times, such activity can be flagged to the system administrator 10 as being suspicious. In the above example, suppose that, in addition to five rows and three columns being retrieved 963 times and seven rows and two columns being retrieved 51 times, one row and 100 columns were retrieved one time. This might indicate that the requesting user 3 is attempting to retrieve too much information in a single command 5, and this activity is reported to the system administrator 10 at step 41 as being suspicious.

Similarly, one could incorporate within parameters 17 a maximum number of rows allowed to be retrieved (possibly for a given field/table or set of fields/tables). Let us assume that this maximum number of rows is 20. Then if a particular training phase retrieval attempts to retrieve 21 or more rows, such a retrieval is deemed to be suspicious and is likewise reported to system administrator 10 at step 41. System administrator 10 can then remove from the set of acceptable retrievals within table 6 such suspicious retrievals.

At step 42, system administrator 10 can force feed rules into table 6. Step 42 can be performed in lieu of or in addition to the training phase. For example, one of the rules provided by the system administrator 10 could be: "no more than 100 rows from CREDIT CARD table are acceptable" or "no more than 100 rows in any one minute from CREDIT CARD table are acceptable".

Rules can also be entirely statistical, such as:

"If the number of rows retrieved by a single user to the CREDIT card field exceeds the historical average for the user's group by more than 2 standard deviations, then generate an alert."

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention. For example, instead of training the system 19 on the number of columns overall, one could single out certain columns (or combinations of columns) of interest within database 1 and train on that basis, e.g., one could train on the SOCIAL SECURITY NUMBER column within the PAYROLL table, and/or the CREDIT CARD NUMBER column within the CREDIT INFORMATION table.

What is claimed is:

1. A computer-implemented method for protecting computer code from malicious retrievers, the method comprising the steps of:
   observing a plurality of retrieval commands that access the computer code;
   observing responses to the plurality of retrieval commands generated by the computer code;
   deriving from the plurality of retrieval commands and the responses a set of retrieval information, the set of retrieval information comprising input vectors characterizing the plurality of retrieval commands;
   converting the set of retrieval information into at least one rule for determining whether retrieval commands are acceptable;
   generating retrieval information characteristic of data sent to a retriever by the computer code in response to a retrieval command issued by the retriever, the retrieval information comprising an input vector characterizing the retrieval command;
   determining whether the retrieval command is acceptable using at least some of the retrieval information as an input to the at least one rule; and
   responsive to the retrieval command being not acceptable, performing at least one of the following:
      restricting the retrieval command from accessing the computer code,
      allowing the retrieval command limited access to the computer code,
      augmenting the command, and
      investigating a sender of the command.

2. The method of claim 1 wherein the retrieval information comprises a retrieval vector.

3. The method of claim 2 wherein the retrieval vector comprises at least one of the following:
   number of rows in the retrieval;
   number of columns in the retrieval;
   number of tables in the retrieval;
   identification of columns in the retrieval;
   identification of tables in the retrieval.

4. The method of claim 1 wherein the retrieval information comprises statistical information.

5. The method of claim 4 wherein at least some of the statistical information is contained in a state table.

6. The method of claim 4 wherein a plurality of retrieval commands are issued, and the statistical information comprises at least one of the following:
   rate of retrieving rows from the computer code;
   rate of retrieving columns from the computer code;
   rate of retrieving tables from the computer code;
   average number of rows retrieved per retrieval command for a given input vector, where an input vector contains parameterized information characteristic of the retrieval command;
   average number of columns retrieved per retrieval command for a given input vector;
   average number of tables retrieved per retrieval command for a given input vector;
   percentage of retrieval commands for which a given column is accessed;
   percentage of retrieval commands for which a given table is accessed;
   percentage of retrieval commands for which a given combination of columns is accessed;
   percentage of retrieval commands for which a given combination of tables is accessed.

7. The method of claim 1 wherein the at least one rule is also accessed by an input vector containing parameterized information characteristic of the retrieval command.

8. The method of claim 7 wherein the input vector is extracted from a retrieval command by at least one technique from the group of techniques comprising real-time auditing and in-line interception.

9. The method of claim 7 wherein the at least one rule is accessed by at least two input vectors, each input vector being associated with the same retrieval command.

10. The method of claim 7 wherein the input vector comprises at least one parameter from the group of parameters comprising:
   canonicalized commands;
   dates and times at which commands access the computer code;
   logins of users that issue commands;
   identities of users that issue commands;

departments of users that issue commands;
applications that issue commands;
IP addresses of issuing users;
identities of users accessing a given field within the computer code;
times of day that a given user accesses a given field within the computer code;
fields accessed by commands;
combinations of fields accessed by commands;
tables within the computer code accessed by commands;
combinations of tables within the computer code accessed by commands.

11. The method of claim 10 wherein a canonicalized command is a retrieval command stripped of literal field data.

12. The method of claim 1, further comprising sending a message to a user or a computer, and updating a log.

13. The method of claim 1 wherein the computer code is a database.

14. The method of claim 13 wherein the retrieval command is a SQL command.

15. The method of claim 1 wherein deriving from the plurality of retrieval commands and the responses a set of retrieval information further comprises deriving from the plurality of retrieval commands and the responses a set of retrieval information based on a set of preselected set of parameters.

16. The method of claim 15 wherein the at least one rule comprises at least one rule derived from statistical information of the set of retrieval information.

17. The method of claim 15 wherein deriving from the plurality of retrieval commands and the responses the set of retrieval information and converting the set of retrieval information into the at least one rule for determining whether the retrieval commands are acceptable are performed in real time.

18. The method of claim 1 wherein the input vectors are extracted from the plurality of retrieval commands by at least one technique from the group of techniques comprising real-time auditing and in-line interception.

19. The method of claim 1 wherein observing the plurality of retrieval commands comprises at least one of:
real-time auditing; and
in-line interception.

20. The method of claim 1 wherein the step of observing the plurality of retrieval commands comprises real-time auditing; and at least one of the following is used to extract the plurality of retrieval commands for observation:
an API that accesses the computer code;
code injection;
patching;
direct database integration;
log file examination.

21. The method of claim 1 wherein the step of observing the plurality of retrieval commands comprises in-line interception; and at least one of the following is interposed between senders of the plurality of retrieval commands and the computer code:
a proxy;
a firewall;
a sniffer.

22. The method of claim 1 wherein the step of observing responses to the plurality of retrieval commands comprises at least one of:
real-time auditing; and
in-line interception.

23. The method of claim 1 wherein the step of observing responses to the plurality of retrieval commands comprises real-time auditing; and at least one of the following is used to extract the plurality of retrieval commands for observation:
an API that accesses the computer code;
code injection;
patching;
direct database integration;
log file examination.

24. The method of claim 1 wherein the step of observing responses to the plurality of retrieval commands comprises in-line interception; and at least one of the following is interposed between senders of the plurality of retrieval commands and the computer code:
a proxy;
a firewall;
a sniffer.

25. The method of claim 1 wherein a duration of performing deriving from the plurality of retrieval commands and the responses the set of retrieval information and converting the set of retrieval information into the at least one rule for determining whether the retrieval commands are acceptable is determined by statistical means.

26. The method of claim 25 wherein:
during the duration, suspicious activity is tracked; and
the suspicious activity is subsequently reported to a system administrator.

27. The method of claim 1 wherein the generating step comprises at least one of:
real-time auditing; and
in-line interception.

28. The method of claim 1 wherein the at least one rule comprises at least one rule provided by a system administrator.

29. The method of claim 1 wherein the at least one rule comprises at least one rule provided by a vendor.

30. The method of claim 1 wherein the at least one rule comprises a pre-established rule table pertaining to retrievals.

31. A computer-readable medium containing computer program instructions for protecting computer code from malicious retrievers, the computer program instructions performing the steps of:
observing a plurality of retrieval commands that access the computer code;
observing responses to the plurality of retrieval commands generated by the computer code;
deriving from the plurality of retrieval commands and the responses a set of retrieval information, the set of retrieval information comprising input vectors characterizing the plurality of retrieval commands;
converting the set of retrieval information into at least one rule for determining whether retrieval commands are acceptable;
generating retrieval information characteristic of data sent to a retriever by the computer code in response to a retrieval command issued by the retriever, the retrieval information comprising an input vector characterizing the retrieval command;
determining whether the retrieval command is acceptable using at least some of the retrieval information as an input to the at least one rule; and
responsive to the retrieval command being not acceptable, performing at least one of the following:
restricting the retrieval command from accessing the computer code,
allowing the retrieval command limited access to the computer code,
augmenting the command, and
investigating a sender of the command.

32. Apparatus for protecting computer code from malicious retrievers, the apparatus comprising:

a computer processor;

a training module configured to be executed by the computer processor for observing a plurality of retrieval commands that access the computer code, observing responses to the plurality of retrieval commands generated by the computer code, and deriving from the plurality of retrieval commands and the responses a set of retrieval information, the set of retrieval information comprising input vectors characterizing the plurality of retrieval commands;

a computation module configured for converting the set of retrieval information into at least one rule for determining whether retrieval commands are acceptable, the at least one rule associated with a input vector, generating retrieval information characteristic of data sent to a retriever by the computer code in response to a retrieval command issued by the retriever, the retrieval information comprising an input vector characterizing the retrieval command, and responsive to the input vector of the retrieval information matching the input vector associated with the at least one rule, determining whether the retrieval command is acceptable using at least some of the retrieval information as an input to the at least one rule; and a post flagging module communicatively connected with the training module and the computation module, the post flagging module configured for responsive to the retrieval command being not acceptable by performing at least one of the following:

restricting the retrieval command from accessing the computer code, allowing the retrieval command limited access to the computer code, augmenting the command, and investigating a sender of the command.

* * * * *